July 6, 1948.    H. L. BLAISDELL    2,444,721
WAVE-SIGNAL TRANSLATING SYSTEM
Filed March 21, 1944
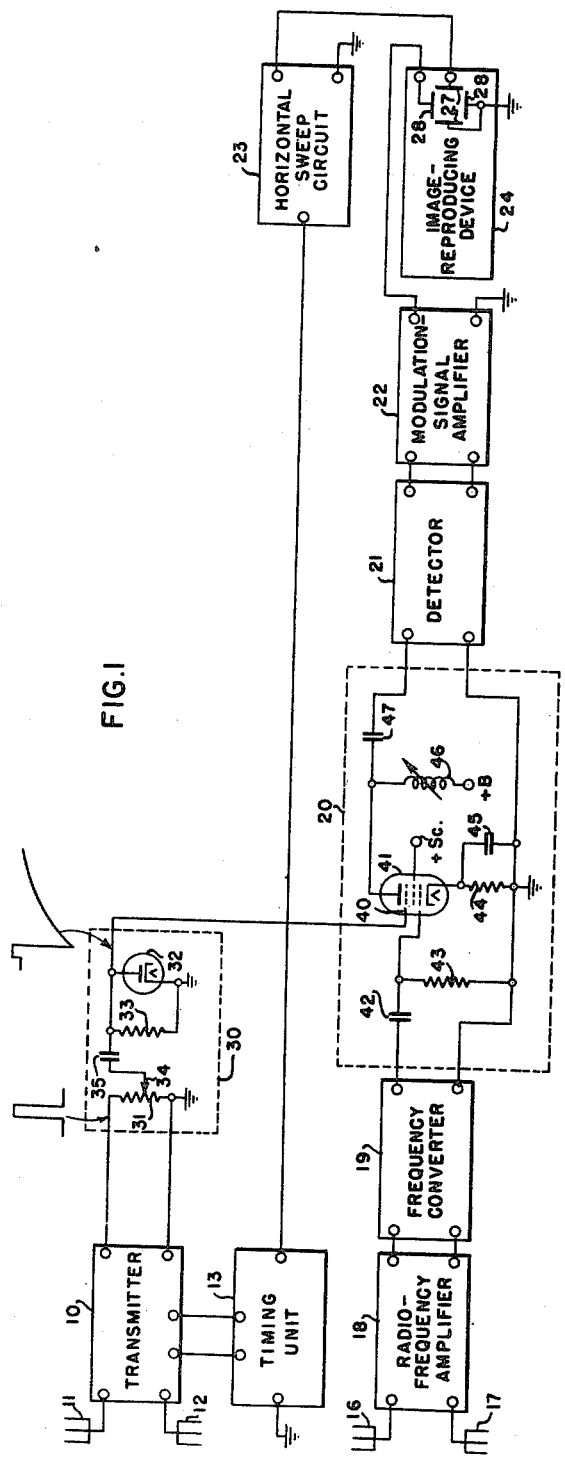
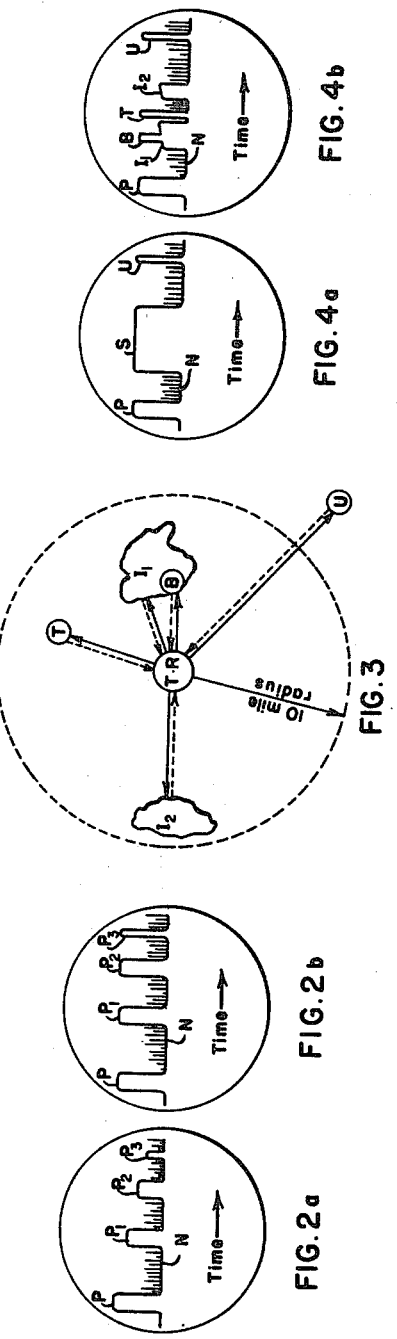
INVENTOR
HAROLD L. BLAISDELL
BY
ATTORNEY Patented July 6, 1948

2,444,721

UNITED STATES PATENT OFFICE 2,444,721

WAVE-SIGNAL TRANSLATING SYSTEM

Harold L. Blaisdell, Little Rock, N. Y., assignor, by mesne assignments, to Hazeltine Research, Inc., Chicago, Ill., a corporation of Illinois Application March 21, 1944, Serial No. 527,406

9 Claims. (Cl. 343—13)

This invention relates to wave-signal translating systems and more particularly to wave-signal translating systems of a type adapted to translate wave signals to a point or area and to receive related wave signals from that point or area, the receiving means being controlled to provide a predetermined sensitivity for related wave signals at the time the related wave signals are received from any distance in response to the transmitted wave signals.

In certain wave-signal translating systems, for example, in systems for locating objects by means of radiant wave signals and in two-way radio-communication systems wherein a transmitter sends out wave signals to a point or area and related wave signals are returned from that point or area in response to the transmitted wave signals, it may be desirable to control the sensitivity of the receiver associated with the transmitter so that the receiver sensitivity at the time of reception of related wave signals bears a predetermined relationship to the distance between the transmitter and the source of related wave signals. The field strength of the received related wave signals of such a system generally varies inversely with the distance of the source of related wave signals of such a system from the receiver and controlled sensitivity of the receiver is desirable to provide a substantially optimum or predetermined sensitivity for desired signals emanating from any distance. If the receiver sensitivity is controlled in a proper manner, overloading of the receiver upon reception of signals from a nearby source can be prevented. In systems of the foregoing type, overloading is undesirable since it obliterates the distinguishing characteristics of desired received wave signals, thereby rendering them indistinguishable from each other.

In radio locating systems which transmit a signal and receive a reflected signal, it may also be expedient to control the sensitivity of the receiver in a manner related to the field intensity of the transmitted signal because the field intensity of the received related signal is often dependent directly upon the field intensity of the transmitted signal.

Prior art wave-signal translating systems of the character mentioned above have proved unsatisfactory under some operating conditions because the sensitivity of the receiver was not properly controlled for the reception of related wave signals from any distance. Likewise, the sensitivity of the receiver of such systems has not been properly regulated in accordance with the field intensity of the transmitted signal where reflected wave signals were received.

It is an object of the invention to provide, in a system of the type under consideration, an arrangement wherein one or more of the above-mentioned disadvantages of prior art systems are eliminated.

It is another object of the invention to provide, in a wave-signal translating system of the type under consideration, a receiver which includes means for providing substantially optimum sensitivity for signals related to transmitted wave signals at the time the related wave signals are received from any distance.

It is a further object of the present invention to provide, in a wave-signal translating system for transmitting wave signals to a point or area and receiving related wave signals from the point or area, means for controlling the sensitivity of the receiver in a predetermined manner for all received related wave signals and also in accordance with the field intensity of the transmitted wave signals.

In accordance with the invention, a wave-signal translating system comprises means for transmitting wave signals to a point, the relative distance of which from the transmitting means may vary, and means including at least one stage of amplification for receiving from the above-mentioned point related wave signals having amplitudes which vary with the distance between the receiving means and the point and which may vary with the field intensity of the transmitted wave signals. The system also includes means responsive to the field intensity of the transmitted wave signals for deriving independently of the translation of wave signals by any stage of amplification of the receiving means which may become overloaded during the normal operation thereof a control effect having a value dependent upon the field intensity of the transmitted wave signals and varying with time from approximately the time of transmission of the wave signals and which approaches a limiting value after a time approximately corresponding to that required for the transmission of the transmitted wave signals to a perdetermined point and for receiving related wave signals from the predetermined point. The system also comprises means responsive to the derived control effect for controlling the sensitivity of the receiving means to provide therein substantially a predetermined sensitivity for related wave signals at the time the related wave signals are received from any distance in response to the transmitted wave signals.

For a better understanding of the present invention, together with other and further objects thereof, reference is had to the following description taken in connection with the accompanying drawing, and its scope will be pointed out in the appended claims.

In the drawing, Fig. 1 is a circuit diagram, partially schematic, of a complete wave-signal translating system embodying the invention; Figs. 2a, 2b, 4a and 4b are response patterns utilized in explaining the operation of the circuit of Fig. 1; and Fig. 3 is a chart to aid in the understanding of the invention.

Referring now more particularly to the drawing, there is illustrated in Fig. 1 a wave-signal translating system comprising a transmitter 10 of conventional design, including an antenna system 11, 12, for transmitting wave signals to a point, the relative distance of which from the transmitter may be subject to variation. A timing unit 13, which may be of a conventional construction, is connected in circuit with the transmitter 10 for supplying keying signals which actuate the transmitter. The system also comprises means including at least one stage of amplification for receiving from the above-mentioned point related wave signals having amplitudes which vary with the distance between the receiving means and the above-mentioned point and which may vary with the field intensity of the transmitted wave signals. The last-named means comprises a modulated-carrier receiver of the superheterodyne type including an antenna system 16, 17 connected to a radio-frequency amplifier 18 to which are connected, in the order named, a frequency converter 19, an intermediate-frequency amplifier 20, a detector 21, a modulation-signal amplifier 22, and an image-reproducing device 24. Device 24 may comprise a conventional cathode-ray tube signal-reproducing tube and includes horizontal deflecting plates 27, 27 and vertical deflecting plates 28, 28. An output signal from amplifier 22 is applied to vertical deflecting plates 28, 28 and the output circuit of a horizontal sweep circuit 23 is connected to the pair of horizontal deflecting plates 27, 27. An output signal from timing unit 13 is also applied to the horizontal sweep circuit 23 for a purpose which will be more fully explained hereinafter. A sensitivity control unit 30 is connected between an output circuit of the transmitter 10 and the intermediate-frequency amplifier 20. The stages or units 10, 13 and 16–24, inclusive, with exception to the unit 20, may all be of conventional well-known construction so that detailed illustration and description thereof are unnecessary herein.

Referring now more particularly to the portion of the system of Fig. 1 comprising the instant invention, unit 30 includes a potential divider 31, connected in circuit with the transmitter 10, and a diode rectifier 32 having a load resistor 33 connected between its anode and cathode. The impedance of resistor 33 is preferably considerably greater than that of resistor 31 and the conductive anode-cathode impedance of diode 32. The anode of diode 32 is coupled to an adjustable tap 34 of resistor 31 through a coupling condenser 35 and is also connected to a suitable control element in the intermediate-frequency amplifier 20.

The system of Fig. 1 also comprises means responsive to the control effect derived in unit 30 for controlling the sensitivity of the receiving means to provide therein substantially a predetermined sensitivity for the received related wave signals at the time the related wave signals are received from any distance in response to the transmitted wave signals. This means comprises a pentode tube 41 in the circuit of intermediate-frequency amplifier 20 adapted to have its gain controlled by the application of the control signal to its suppressor grid 40. The intermediate-frequency amplifier, which may comprise one or more stages, is shown as a single-stage unit for simplicity. The output circuit of frequency converter 19 is connected to the input electrodes of tube 41 through a coupling condenser 42, a grid-leak resistor 43, and a cathode resistor 44 bypassed by a condenser 45. A winding 46 tuned to the intermediate frequency of the receiver is connected in the anode circuit of tube 41. Suitable unidirectional operating potentials for tube 41 are supplied from sources indicated +Sc and +B. The input circuit of detector 21 is connected to the output circuit of tube 41 through a coupling condenser 47.

Neglecting for the moment the function of units 20 and 30, the operation of the wave-signal translating system just described is conventional and, therefore, need not be explained in detail. Briefly, however, in response to an impulse from timing unit 13 there is developed by the transmitter 10 a wave signal which is applied to the antenna system 11, 12 and radiated to a distant point. A related wave signal from the distant point is returned to the receiver either by reflection or by means of a transmitter located at the distant point as, for example, the transmitter of a radio beacon. The returning related wave signals are intercepted by antenna system 16, 17, selected and amplified in the radio-frequency amplifier 18 and applied to the frequency converter 19, wherein the signals are converted into intermediate-frequency signals which, in turn, are selectively amplified in the intermediate-frequency amplifier 20 and delivered to the detector 21. The modulation components of the signals are derived by the detector 21 and applied to the amplifier 22 wherein they are amplified. Sweep circuit 23 is adapted to be synchronized by a signal from timing unit 13 and provides a suitable saw-tooth voltage for deflecting plates 27, 27 normally to cause the beam of the cathode-ray tube to trace a horizontal line on the screen. The modulation signal from amplifier 22 is applied to vertical deflection plates 28, 28 to provide a pattern on the screen of the image-reproducing device in accordance with the received wave signals.

The amplitudes of the received related wave signals vary with the distance between the receiver and the point from which related wave signals originate, so that, for a small distance between the receiver and the above-mentioned point, a strong related signal is received, whereas, for a signal emanating from a relatively remote point, a considerably weaker related signal is obtained. Therefore, if the sensitivity of the receiver is substantially constant, as in the case when the action of control unit 30 is neglected, the display pattern on the screen of the image-reproducing device 24 may resemble that illustrated in Fig. 2a for pulse-type signals received from a plurality of points at unequal distances from the transmitter 10. Pulse P represents the pulse translated by transmitter 10 and received directly by the receiver. Pulses P₁, P₂ and P₃ are the reproductions by unit 24 of pulses of progressively decreasing amplitudes received from points at increasing distances from the transmitter.

Pulse P3, the reproduction of the pulse transmitted from one of the points, may, for identification purposes, be of shorter duration than the other transmitted pulses. The narrow vertical lines N indicate noise components which are received or originate in the receiver.

Other operating characteristics and certain limitations of conventional systems of the type under consideration may best be explained by reference to Fig. 3 and Fig. 4a. Fig. 3 represents diagrammatically the disposition of a combined transmitter-receiver arrangement TR, similar to Fig. 1, at the center of a circle having a radius of about ten miles and in the vicinity of a plurality of points or objects from which related wave signals are returned to the receiver. These points, which are located at various distances from the wave-signal translating system TR, may, for example, comprise objects such as islands $I_1$ and $I_2$, and radio beacons or transpondors B, T, and U. The wave signals transmitted from TR are intercepted by each of the above-mentioned objects after a period of time which is proportional to the distance between the transmitter and the individual objects. In response to the transmitted wave signal, there is developed by each of the objects a related wave signal. This related wave signal is a reflected signal or a radio echo in the case of an island, or a signal developed in the transmitter of a transpondor or radio beacon. The field strength of each reflected wave signal at the receiver TR is determined, to some extent, by the distance between the transmitter TR and the particular reflecting object returning related wave signals to the unit TR. The related wave signal developed by the beacon B or one of the transpondors T or U, however, has a field intensity of considerably greater magnitude than the received reflected wave signals.

A typical response pattern for a conventional wave-signal translating system TR operating in a location, as described in connection with Fig. 3, is shown in Fig. 4a. The transmission of a pulse-type wave signal by unit TR develops in the receiver of the unit TR a pulse of large amplitude which overloads the receiver. The overload level of the receiver is indicated by the upper horizontal tip of the pulse signal P (Fig. 4a). A brief interval after the pulse P is transmitted, a strong related signal or radio echo is received from the nearest island $I_1$, and this signal may be of sufficient intensity, due to the close proximity of the island, that the output circuit of the receiver is again overloaded. During the interval that the reflected signal is being received from the island $I_1$, a related signal from the beacon B on that island may also be received. However, due to the overloaded condition of the receiver, the signal from the beacon B may not be distinguishable from the reflected signal. Shortly after the reception of the signals from the island $I_1$ and beacon B, there may also be received a related signal from the transpondor T and a strong reflected signal from the other island $I_2$, which signals are sufficient to maintain the receiver in an overloaded condition. Consequently, a long continuous output pulse, as illustrated by the pulse S, may be produced on the screen of the image-reproducing device 24 so that the distinguishing characteristics of the desired responses from the beacon B and the transpondor T are completely obliterated by the strong echoes. Following the reception of the above-mentioned signals, a related wave signal is received from the transpondor U and is reproduced on the screen of unit 24 as the pulse U which is illustrated in Fig. 4a.

It will be apparent from the description of the operation of the translating system above that reliable indications from points within the ten-mile radius are substantially unobtainable under the assumed conditions. If the gain of the receiver is reduced by a manual gain-control adjustment (not shown), a saturated output may in some instances be avoided so that certain of the related signals from nearby objects may be properly distinguished. However, any advantage from such an adjustment is completely offset by the resultant inability to receive related signals from more remote objects, such as the transpondor U, so that the utility of the system for many practical purposes is almost entirely destroyed.

Referring now to the operation of the system of Fig. 1 when incorporating the features of the present invention, the keying signal from timing unit 13 actuates the transmitter 10 which radiates a wave signal, for example, one of the pulse type, from the antenna system 11, 12. At approximately the time of transmission, or simultaneously therewith, there is developed across resistor 31 a pulse signal of positive polarity, and preferably one of short duration having comparatively steep leading and trailing edges, which is applied to diode 32 through condenser 35. The magnitude of the impulse applied to diode 32 is controllable by movement of the adjustable contact 34. When the anode of diode 32 is driven positive, the tube is rendered conductive and current flows through the parallel path comprising the anode-cathode circuit of diode 32 and the resistor 33. When the instantaneous value of the pulse applied to the diode returns to or approaches the zero level, tube 32 is operated to cutoff, thereby leaving a high negative charge on that plate of the condenser 35 which is connected to the anode of tube 32. Condenser 35 thereafter is discharged exponentially through resistor 33 and a portion of the resistor 31 at a rate determined by the time constant of the discharge circuit to provide a generally saw-tooth control effect for application to the suppressor grid of the intermediate-frequency amplifier 22.

The discharge time constant of the circuit including condenser 35 and resistor 33 is preferably selected so that the control effect, which is derived in control unit 30, has a value which varies with time from approximately the time of transmission of wave signals from transmitter 10 and which approaches a limiting value after a time corresponding to that required for the transmission of wave signals to a predetermined point, such as to a point which is then miles from the transmitter 10, and for the return of the related wave signals from this point.

The related wave signal which is developed in response to the signal transmitted by transmitter 10, for example by reflection, is intercepted by the antenna system 16, 17 of the receiver and is translated in the usual manner by units 18 and 19 to the intermediate-frequency amplifier 20. The control effect derived in control unit 30 and applied to the suppressor grid of tube 41 is effected to alter the sensitivity of the receiver to the received wave signals. This control effect provides an automatic gain reduction followed by a controlled rate of recovery of the sensitivity of the receiver. The increase in sensitivity is exponential in character and the field intensities of related received reflected signals vary inversely in accordance with the distances or the square of the distances between the sources of related wave signals and the transmitter, depending on whether the propagation was in free space or over the earth, respectively. Therefore, a suitable selection of parameters can be utilized to provide in the receiver a predetermined or optimum sensitivity for all related wave signals at the time the related wave signals are received from any distance in response to the transmitted wave signals. One advantage of the system of the present invention is set forth graphically in Fig. 2b, where the pulse P represents the shape of the transmitted pulse from the transmitter 10. As before stated, related wave signals reflected from close objects are received with a relatively high intensity. Therefore, the high initial negative bias followed by a gradually reduced bias on the suppressor grid of the intermediate amplifier 20 provides a receiver sensitivity such that the reproduced signals $P_1$, $P_2$ and $P_3$ developed in unit 24 from the received reflected signals have a substantially constant amplitude, as represented in Fig. 2b.

Reference is made to Fig. 4b for a description of the operation of a system, as outlined above in connection with Fig. 3, when the control circuit of unit 30 is effective. The pulse P of Fig. 4b represents the transmitted wave signal and the pulse $I_1$ represents the reproduced signal which is developed in unit 24 from the related signal received from the island $I_1$ nearest the transmitter TR. The decreased gain provided in the receiver by the control effect developed in control unit 30 is such as to reduce the amplitude of the reproduced reflected signal $I_1$ below that corresponding to the saturation level of the receiver, but yet is sufficient to give a satisfactory indication. Since the received related signal from the beacon B has a greater field intensity than the strong reflected signal received from island $I_1$, the reproduced signal B derived from the related signal from beacon B projects above the signal $I_1$ on the screen of the image-reproducing device 24, thus making signal B easily distinguishable from signal $I_1$ and providing a positive identification of both objects. The reproduced signal T corresponding to the related signal from the nearby transpondor T is effectively translated and is visibly separated from pulse $I_1$ since the receiver was not overloaded by the last-named signal. The reproduced pulse $I_2$ developed from the received related signal from the more distant island $I_2$ is also distinct from the signal T of greater amplitude derived from the received related signal from the transpondor T. Signal U, which is developed from the received related signal from the transpondor U located beyond the predetermined ten-mile distance, is effectively translated since, during this period, the receiver is preferably operated at a substantially constant high sensitivity. Thus, it will be manifest that a distinct and useful indication is derived by the receiver for each received related wave signal, a result which heretofore was not achieved.

It will be evident that the wave-signal translating system is particularly useful when nondirective antennas are employed, since related wave signals may be received from every direction, thus increasing the probability of the receiver being overloaded by strong signals from nearby objects.

While the operation has been described in connection with a geographic area including a predetermined radial distance of ten miles, it will be apparent that this is a representative distance and that, by a suitable selection of time constants, other base distances determined primarily by the particular result which is desired may also be used.

It will be apparent that the signal input to control unit 30 may be derived from timing unit 13 instead of the transmitter 10. However, it is preferable to derive the control signal from the transmitter at such a point that the signal input to unit 30 varies in amplitude with the field intensity of the transmitted pulse. This has the effect of causing the derived control signal which is applied to unit 20 to vary with the amplitude of the transmitted pulse which, in some cases, is desirable.

From the above description of the system and explanation of the operation thereof, it will be manifest that the control unit 30 is effective to derive a control effect independently of the translation of wave signals by any stage of amplification of the receiver which may become overloaded during normal operation thereof. It will also be clear that the derived control effect has a value dependent upon the field intensity of the transmitted wave signals and varying with time from approximately the time of transmission of the wave signals and which approaches a limiting value after a time approximately corresponding to that required for the transmission of wave signals to a predetermined point and for receiving the related wave signals from that predetermined point.

While applicant does not wish to limit the invention to any specific circuit constants, the following circuit constants are given as illustrative of values of the circuit elements which may be utilized in the circuit of Fig. 1:

| | | |
|---|---|---|
| Resistor 31 | ohms | 1,000 |
| Resistor 33 | do | 22,000 |
| Resistor 43 | do | 8,200 |
| Resistor 44 | do | 100 |
| Condenser 35 | microfarads | 0.002 |
| Condenser 42 | do | 200 |
| Condenser 45 | do | 0.01 |
| Diode 32 | | Type 6H6 |
| Tube 41 | | Type 7W7 |
| +Sc | volts | 112 |
| +B | do | 110 |
| Rectangular input pulse to control unit 30: | | |
| Amplitude | volts | 50 |
| Duration | microseconds | 2 to 6 |

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A wave-signal translating system comprising, means for transmitting wave signals to a point, the relative distance of which from said transmitting means may vary, means including at least one stage of amplification for receiving from said point related wave signals having amplitudes varying with the distance between said receiving means and said point and which may vary with the field intensity of said transmitted wave signals, means responsive to the field intensity of said transmitted wave signals for deriving independently of the translation of wave signals by any stage of amplification of said receiving means which may become overloaded during the normal operation thereof a control effect having a value dependent on the field intensity of said transmitted wave signals and varying approximately exponentially with time from approximately the time of transmission of said wave signals and which approaches a limiting value after a time approximately corresponding to that required for the transmission of said wave signals to a predetermined point and for receiving said related wave signals from said predetermined point, and means responsive to said control effect for controlling the sensitivity of said receiving means to provide therein substantially a predetermined sensitivity for said related wave signals at the time said related wave signals are received from any distance in response to said transmitted wave signals.

2. A wave-signal translating system comprising, means for transmitting wave signals to a point, the relative distance of which from said transmitting means may vary, means including at least one stage of amplification for receiving from said point related wave signals having amplitudes varying with the distance between said receiving means and said point and which may vary with the field intensity of said transmitted wave signals, means responsive to the field intensity of said transmitted wave signals and comprising an energy-storage device having a rapid charging rate and a relatively slow discharging rate for deriving independently of the translation of wave signals by any stage of amplification of said receiving means which may become overloaded during the normal operation thereof a control effect having a value dependent on the field intensity of said transmitted wave signals and varying with time from approximately the time of transmission of said wave signals and which approaches a limiting value after a time approximately corresponding to that required for the transmission of said wave signals to a predetermined point and for receiving said related wave signals from said predetermined point, and means responsive to said control effect for controlling the sensitivity of said receiving means to provide therein substantially a predetermined sensitivity for said related wave signals at the time said related wave signals are received from any distance in response to said transmitted wave signals.

3. A wave-signal translating system comprising, means for transmitting wave signals to a point, the relative distance of which from said transmitting means may vary, means including at least one stage of amplification for receiving from said point related wave signals having amplitudes varying with the distance between said receiving means and said point and which may vary with the field intensity of said transmitted wave signals, integrating means responsive to the field intensity of said transmitted wave signals for deriving independently of the translation of wave signals by any stage of amplification of said receiving means which may become overloaded during the normal operation thereof a substantially saw-tooth control effect having a value dependent on the field intensity of said transmitted wave signals and varying with time from approximately the time of transmission of said wave signals and which approaches a limiting value after a time approximately corresponding to that required for the transmission of said wave signals to a predetermined point and for receiving said related wave signals from said predetermined point, and means responsive to said control effect for controlling the sensitivity of said receiving means to provide therein substantially a predetermined sensitivity for said related wave signals at the time said related wave signals are received from any distance in response to said transmitted wave signals.

4. A wave-signal translating system comprising, means for transmitting wave signals to a point, the relative distance of which from said transmitting means may vary, means including at least one stage of amplification for receiving from said point related wave signals having amplitudes varying with the distance between said receiving means and said point and which may vary with the field intensity of said transmitted wave signals, means responsive to the field intensity of said transmitted wave signals for deriving independently of the translation of wave signals by any stage of amplification of said receiving means which may become overloaded during the normal operation thereof a control effect having a value dependent on the field intensity of said transmitted wave signals and varying with time from approximately the time of transmission of said wave signals and which approaches a limiting value after a time approximately corresponding to that required for the transmission of said wave signals to a predetermined point and for receiving said related wave signals from said predetermined point, and amplifier means responsive to said control effect for controlling the sensitivity of said receiving means to provide therein substantially a predetermined sensitivity for said related wave signals at the time said related wave signals are received from any distance in response to said transmitted wave signals.

5. A wave-signal translating system comprising, means for transmitting wave signals to a point, the relative distance of which from said transmitting means may vary, means including at least one stage of amplification for receiving from said point related wave signals having amplitudes varying with the distance between said receiving means and said point and which may vary with the amplitude of said transmitted wave signals, means responsive to the amplitude of said transmitted wave signals for deriving independently of the translation of wave signals by any stage of amplification of said receiving means which may become overloaded during the normal operation thereof a control effect having a value dependent on the field intensity of said transmitted wave signals and varying with time from approximately the time of transmission of said wave signals and which approaches a limiting value after a time approximately corresponding to that required for the transmission of said wave signals to a predetermined point and for receiving said related wave signals from said predetermined point, and means responsive to said control effect for controlling the sensitivity of said receiving means to provide therein substantially a predetermined sensitivity for said related wave signals at the time said related wave signals are received from any distance in response to said transmitted wave signals.

6. A wave-signal translating system comprising, means for transmitting wave signals to a point, the relative distance of which from said transmitting means may vary, means including at least one stage of amplification for receiving from said point related wave signals having amplitudes varying with the distance between said receiving means and said point and which may vary with the field intensity of said transmitted wave signals, means responsive to the field intensity of said transmitted wave signals for deriving independently of the translation of wave signals by any stage of amplification of said receiving means which may become overloaded during the normal operation thereof a control effect having a value dependent on the field intensity of said transmitted wave signals and varying with time from approximately the time of transmission of said wave signals and which approaches a limiting value after a time approximately corresponding to that required for the transmission of said wave signals to a predetermined point and for receiving said related wave signals from said predetermined point, means for adjusting the magnitude of said control effect, and means responsive to said control effect for controlling the sensitivity of said receiving means to provide therein substantially a predetermined sensitivity for said related wave signals at the time said related wave signals are received from any distance in response to said transmitted wave signals.

7. A wave-signal translating system comprising, means for transmitting wave signals to a point, the relative distance of which from said transmitting means may vary, means including at least one stage of amplification for receiving from said point related wave signals having amplitudes varying with the distance between said receiving means and said point and which may vary with the field intensity of said transmitted wave signals, means responsive to the field intensity of said transmitted wave signals for deriving independently of the translation of wave signals by any stage of amplification of said receiving means which may become overloaded during the normal operation thereof a control effect having a value dependent on the field intensity of said transmitted wave signals and varying with time from approximately the time of transmission of said wave signals and which approaches a limiting value after a time approximately corresponding to that required for the transmission of said wave signals to a predetermined point and for receiving said related wave signals from said predetermined point, and means responsive to said control effect for reducing the sensitivity of said receiving means at substantially the time of transmission of said wave signals and for gradually restoring its sensitivity so that said related wave signals from any distance are received with a predetermined sensitivity.

8. A wave-signal translating system comprising, means for transmitting wave signals to a point, the relative distance of which from said transmitting means may vary, means including at least one stage of amplification for receiving from said point related wave signals having amplitudes varying with the distance between said receiving means and said point and which may vary with the field intensity of said transmitted wave signals, means responsive to the field intensity of said transmitted wave signals for deriving independently of the translation of wave signals by any stage of amplification of said receiving means which may become overloaded during the normal operation thereof a control effect having a value dependent on the field intensity of said transmitted wave signals and varying with time from approximately the time of transmission of said wave signals and which approaches a limiting value after a time approximately corresponding to that required for the transmission of said wave signals to a predetermined point and for receiving said related wave signals from said predetermined point, and means responsive to said control effect for controlling the sensitivity of said receiving means to provide therein substantially a predetermined sensitivity for said related wave signals at the time said related wave signals are received from any distance in response to said transmitted wave signals.

9. A wave-signal translating system comprising, means for transmitting wave signals to a plurality of points including a given point at a predetermined distance from said transmitting means, means including at least one stage of amplification for receiving from said points related wave signals having predetermined amplitudes which vary with the distances between said receiving means and said points and which may vary with the field intensity of said transmitted wave signals, means responsive to the field intensity of said transmitted wave signals for deriving independently of the translation of wave signals by any stage of amplification of said receiving means which may become overloaded during the normal operation thereof a control effect having a value dependent on the field intensity of said transmitted wave signals and varying with time from approximately the time of transmission of said wave signals and which approaches a limiting value after a time approximately corresponding to that required for the transmission of said wave signals to said given point and for receiving said related wave signals from said given point, and means responsive to said control effect for controlling the sensitivity of said receiving means to provide therein predetermined reduced sensitivities for said related wave signals received from points at any distances less than said predetermined distance at the time said related wave signals from said last-mentioned points are received in response to said transmitted wave signals and a greater substantially constant sensitivity for said related wave signals received from points at distances greater than said predetermined distance.

HAROLD L. BLAISDELL.

REFERENCES CITED

The following references are of record in the file of this patent:

UNITED STATES PATENTS

| Number | Name | Date |
|---|---|---|
| 2,158,198 | Prescott | May 16, 1939 |
| 2,167,492 | Sproule | July 25, 1939 |
| 2,361,648 | Petty | Oct. 31, 1944 |

Certificate of Correction

Patent No. 2,444,721.

July 6, 1948.

HAROLD L. BLAISDELL

It is hereby certified that errors appear in the printed specification of the above numbered patent requiring correction as follows: Column 6, line 56, for the word "then" read *ten*; column 8, line 40, for "microfarads" read *microfarad*; line 41, for "do" read *micromicrofarads*; line 42, for "do" read *microfarad*; and that the said Letters Patent should be read with these corrections therein that the same may conform to the record of the case in the Patent Office.

Signed and sealed this 30th day of November, A. D. 1948.

[SEAL]

THOMAS F. MURPHY,
*Assistant Commissioner of Patents.*